United States Patent Office 3,245,140
Patented Apr. 12, 1966

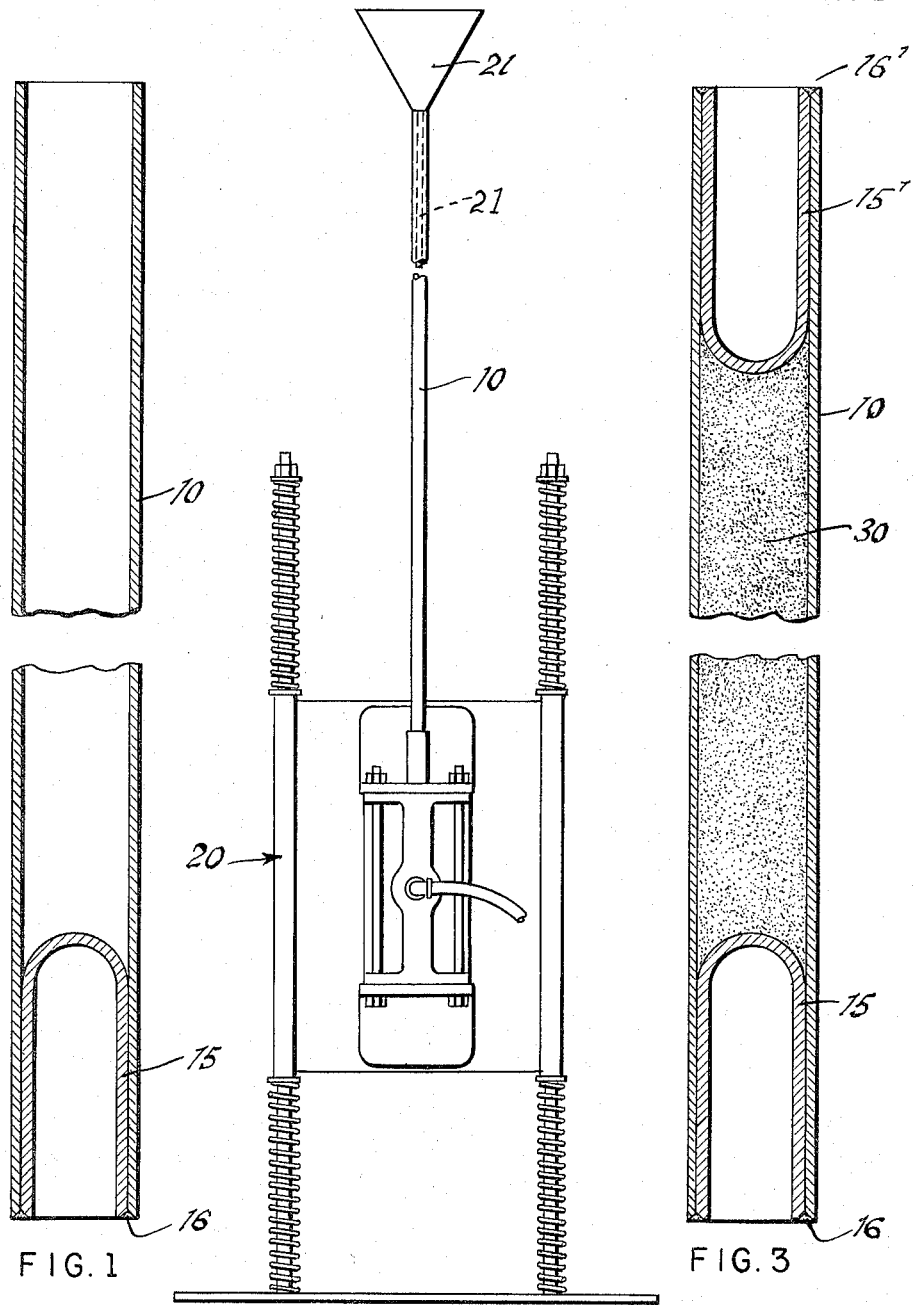

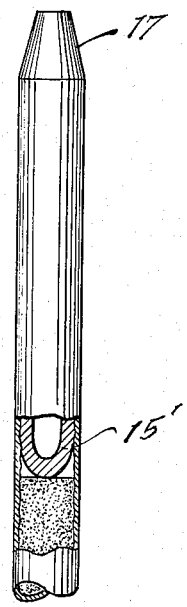
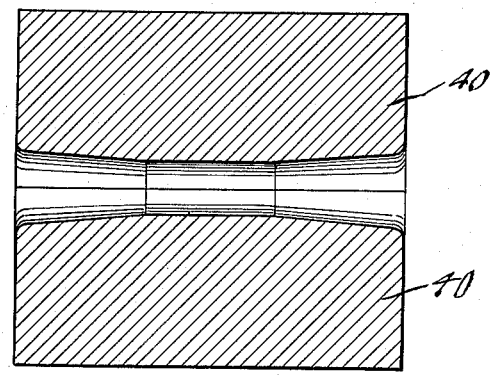
FIG. 4
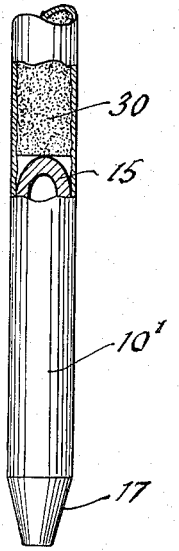
FIG. 5
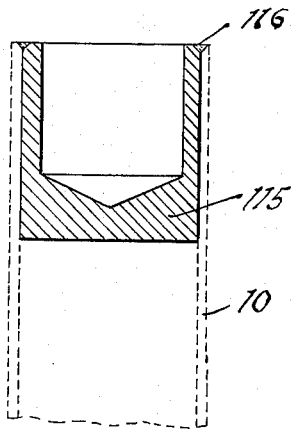
FIG. 10
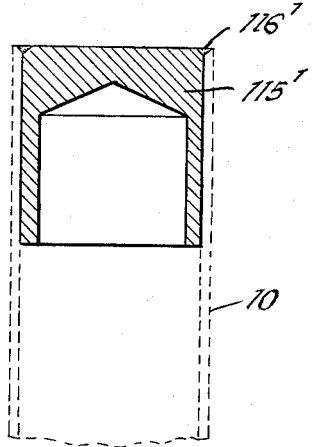
FIG. 11

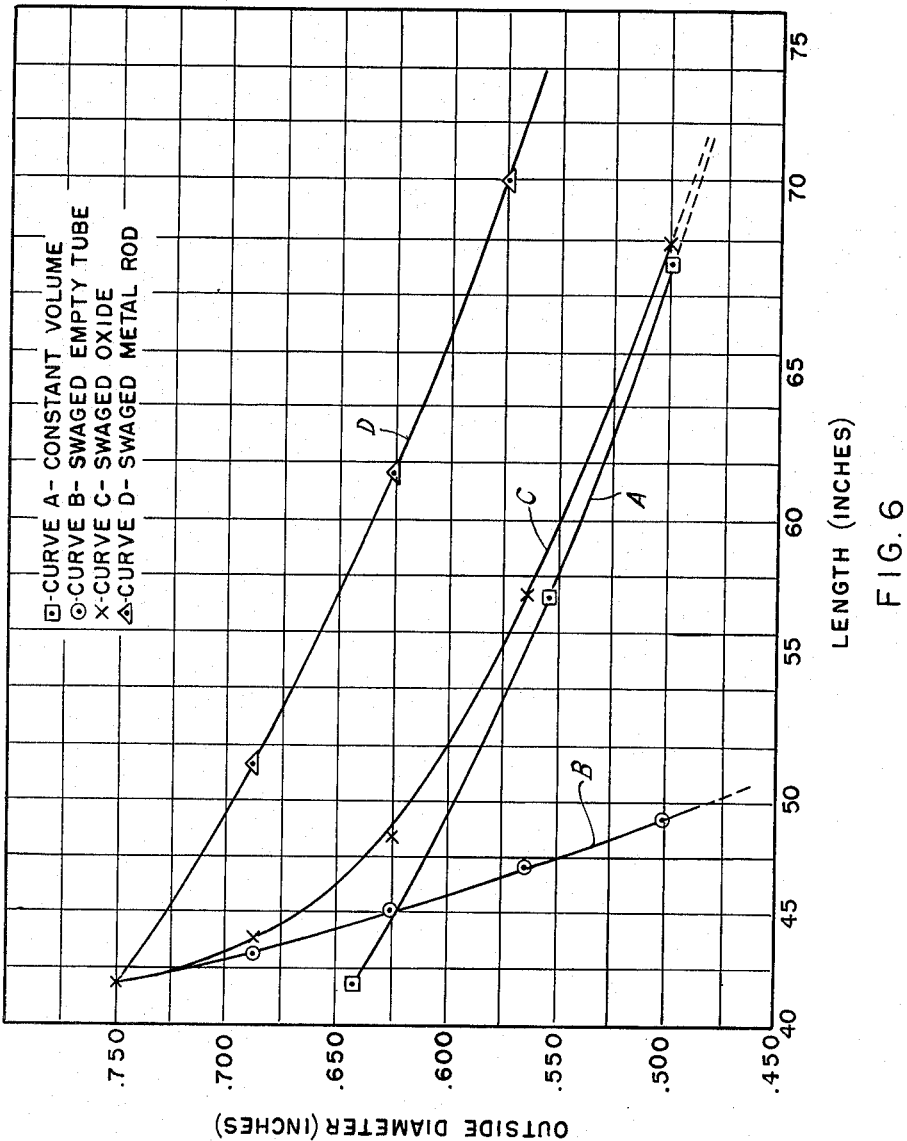

3,245,140
FABRICATION OF OXIDE FUEL ELEMENTS
BY ROTARY SWAGING
Wallace Markert, Jr., and Paul C. Thys, Alliance, Ohio, assignors to The Babcock & Wilcox Company, New York, N.Y., a corporation of New Jersey
Filed May 27, 1958, Ser. No. 738,105
9 Claims. (Cl. 29—420.5)

This invention relates to fuel and control elements for atomic energy reactors and, more particularly, to novel elements of this type in the form of elongated rods or pins and to novel methods of fabricating such elements.

The use of metallic uranium fuel elements in power reactors has been limited by their susceptibility to radiation damage and their poor corrosion resistance. Uranium reacts chemically with water, which makes the use of uranium unsuitable for water cooled reactors due to the damage occurring if the sheath of the fuel element develops a leak. The problem is accentuated with an increase in the temperature of the water, as the corrosion rate of uranium in water increases at a rate which is a multiple of the rate of increase in water temperature.

For these reasons, there has been considerable investigation of the possibility of using relatively stable uranium compounds as fuel elements, and techniques have been developed for using the more promising compounds, such as metal clad urania ($UO_2$) and thoria ($ThO_2$). These compounds are presently available in the powdered or granular form and must be processed for use in fuel elements. A disadvantage in the use of compounds, such as $UO_2$, for fuel elements is the inherent low thermal conductivity, which could produce excessive temperatures in the center of the fuel elements with possible melting of the compound.

An important factor in the fabrication of fuel elements is the maintenance of a fixed weight ratio of the active material to the cladding material, this ratio being contingent, in part, upon the capture cross-section and poisoning ability of the cladding metal. When the aforementioned compounds are used in fuel elements, attainment of such ratio presents difficulties, as the active material is in the combined form. However, knowing the percentage of uranium in urania, for example, it is possible to calculate the weight of urania containing a given amount of uranium. However, for a given volume of the cladding, related to the length, diameter, and wall thickness of the cladding, the compound packed therein must have a certain density in order to provide the weight of active material necessary for the required ratio of the active material to the cladding material. The attainment of this density within preset limitations as to length and cross-section of each fuel element, as determined by characteristics of the coolant and its desired temperature range, presents substantial problems as to fabrication, and cost of the fuel elements.

Techniques have been proposed for fabricating fuel elements utilizing these relatively stable compounds in the powdered form. One known technique is that of compressing pellets of an oxide compound and sintering the pellets. The pellets are then packed into a cladding of the requisite length and cross-sectional area. With this technique, a pellet density approaching the theoretical density of the oxide is attained, but the overall density of the pellets packed into the metal container or cladding is relatively low. More importantly, the fabrication costs are very high due to the necessity of measuring individual quanta of the powdered oxide, charging each quanta into a press, compressing the quanta into a pellet, sintering the pellet, grinding or otherwise finishing the sintered pellet to close tolerances, packing the pellets into the metal cladding, and sealing the cladding. Only about two-thirds of the initial or starting material is effectively utilized in the finished fuel element and the overall density of the packing in the fuel element is of a relatively low order as compared to the theoretical density of the oxide.

It has also been proposed to fabricate fuel elements using the powdered oxide compounds by utilizing a rotary swaging procedure such as employed in fabricating electric resistance heating elements involving a high resistance core surrounded by a ceramic insulating material encased in an outer metal sheath. However, the parameters involved are sufficiently dissimilar that the results of applying this technique have been unsatisfactory both from the standpoint of meeting the tolerances required and from the standpoint of fabrication cost.

For example, in the fabrication of such electrical elements, the objective of the rotary swaging is to obtain a uniform thickness of the insulating material between the solid inner metal resistance and the encasing metal sheath, with the density of the insulating material being of relatively minor importance. On the other hand, the controlling objective in fuel element fabrication is to obtain a predetermined density of the powdered compounds so as to meet the foregoing criteria of length, cross-sectional area, and ratio of active cladding material in the completed fuel element.

In order to meet these criteria, a number of variables must be accurately controlled. Such variables include, for example, the density of the powdered compound in the cladding element before rotary swaging, the initial dimensions of the cladding material, the amount of reduction in area and increase in length of the packed cladding during rotary swaging, the efficacy of sealing the ends of the packed tubular cladding, and the physical characteristics of the powdered compounds.

Attempts to control these several variables in production of fuel elements by rotary swaging of a metal cladding container packed with the powdered compound hitherto have failed to produce a fuel element meeting the predetermined criteria of overall length and cross-sectional area of the element and density of the powdered compound such as $UO_2$.

In accordance with the present invention, it has been found that a fuel element utilizing powdered compounds, such as $UO_2$, clad in a metal sheath, such as stainless steel, can be produced by rotary swaging to meet the requisite criteria as to length, cross-sectional area, and final or swaged density of the powdered compound by cutting a tube of the cladding metal, having a predetermined outside diameter and wall thickness, to a predetermined length, sealingly capping one end of the cut tube, packing this tube with a predetermined weight of the powdered material to a predetermined density, sealingly capping the open end of the tube, and rotary swaging the packed and sealed unit to obtain the predetermined final length and outside diameter. When these conditions are met, the density of the packing in the completed fuel element is such as to provide the requisite ratio of active material to cladding material. No sintering is required, although the element may be subjected to a sintering temperature after rotary swaging.

For an understanding of the invention principles, reference is made to the following description of typical embodiments thereof as illustrated in the accompanying drawings.

In the drawings:

FIG. 1 is a sectional view of the metal cladding or container for the powdered oxide, before filling;

FIG. 2 is an elevation view of a vibration device used for filling the cladding or container of FIG. 1 with a predetermined weight of the powdered oxide;

FIG. 3 is a view similar to FIG. 1 illustrating the cladding or container filled and sealed at both ends but before rotary swaging;

FIG. 4 is a sectional view through typical rotary swaging dies used in practicing the invention;

FIG. 5 is an elevation view, partly broken away and partly in section, of the finished fuel element;

FIGS. 6, 7, 8 and 9 are graphs illustrating certain control factors involved in practicing the invention; and FIGS. 10 and 11 are partial sectional views, similar to FIG. 1, illustrating alternative forms of end capping of the cladding or container.

Figure 7:
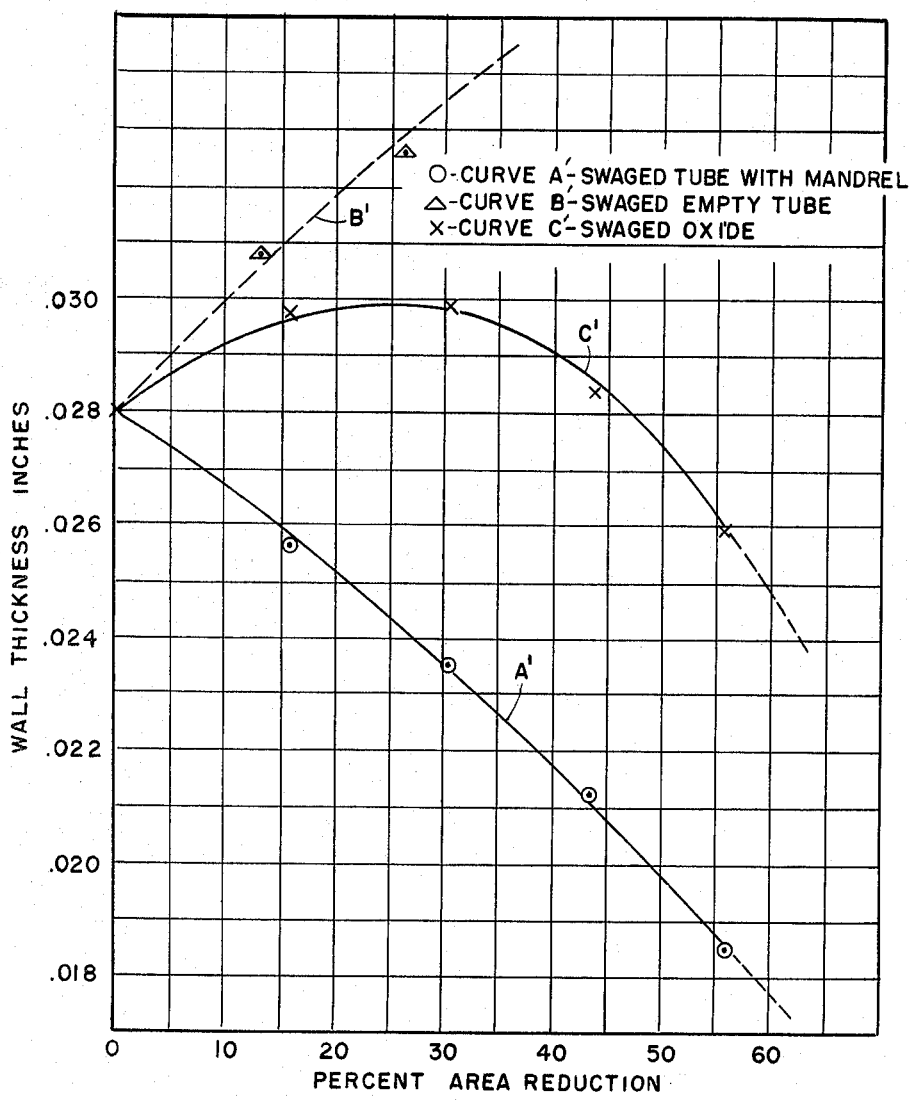

The basic principle of the present invention is that a finished fuel element, meeting the preset criteria as to length, cross-sectional area, and density of the oxide compound sufficient to provide the necessary ratio of active to cladding material, may be obtained by starting with an elongated tube of the cladding material of larger diameter than the final fuel element and which, when provided with its end caps, will provide the necessary amount of cladding metal to obtain the desired final ratio of active material to cladding material. This tube is capped at one end and placed upright in a vibrating device. The tube is then filled with a measured weight of the oxide compound while the tube is being continuously vibrated, and after the measured weight of oxide compound has been placed in the tube, a "rider" or weight is placed on top of the powder and the vibration is continued for a sufficient time to obtain a predetermined "vibrated density" of the filling material. Assuming that the tube has the correct length as calculated, the placing of a second end cap into the tube on top of the powder will result in a compact mass of powder being in the tube between the two end caps. The second cap is then welded or otherwise sealed to the end of the tube. Following this operation, the filled and sealed cladding tube is rotary swaged to reduce its diameter to the final pre-set diameter and increase its length to the final pre-set length. The ends of the tube may be finished as desired.

By starting with a tube of the proper calculated dimensions and filling this tube with a predetermined weight of the powdered compound while continuously vibrating the tube to obtain a "vibrated density" of a predetermined value, a final fuel element can be produced, after rotary swaging, which meets the pre-set criteria of overall length, cross-sectional area, and density of the powdered compound to attain the desired ratio of active material to cladding material.

The principles of the invention are applicable not only to fuel elements, having cores of various compounds of active material and encased in various cladding metals, but also to metal clad control rods of materials such as powdered or granulated boron carbide. For example, fuel elements have been fabricated using different varieties or uranium oxide and thorium oxide as cores, and stainless steels, aluminum, zirconium alloys, and other metals as the cladding. By way of giving a specific application of the principles of the invention, the invention will be more particularly described as applied to the fabrication of a fuel element having a core of high-fired $UO_2$ and a cladding of type 304 stainless steel.

An exemplary fuel element of this latter type has critical final values as follows: overall length, $72''\pm0.5''$; outside diameter, $0.5''\pm0.002''$; wall thickness of metal cladding, $0.026''\pm0.0025''$; active length of uranium oxide, $66''\pm\frac{1}{4}''$; density of uranium oxide 9.50 grams/cc. From these criteria, the volume of stainless steel may be calculated as 2.56 cu. ins. and the weight of uranium oxide powder, at the required density, as 1630 grams.

The required volume of metal is provided, in a particular example, by a starting element comprising a stainless steel tube 10 (FIG. 1) having a length of 45", an outside diameter of 0.75", and a wall thickness of 0.028".

Before filling with the powdered oxide, tube 10 has a stainless steel cap 15 set in one end and seal welded to tube 10 as at 16. The seal weld may be effected by "Heliarc" welding or by induction welding. Cap 15 has an outer diameter substantially equal to the inner diameter of tube 10, and a starting length such that its length after rotary swaging will be 3.00", and has a slip fit in tube 10.

FIGS. 1 and 3 illustrate a presently preferred form of end cap 15 or 15', which may be designated as a "bullet nose" end cap. This end cap is formed by swaging a piece of stainless steel tubing to the proper outside diameter, heating the tubing, and forging it over a mandrel to the proper shape and dimensions. The closed end is then seal welded. In the particular example, the end caps have a starting length of 2.375" to produce a final length of 3.00".

The tube 10, having an end cap 15 in one end, is then placed upright in a vibrator 20 as shown in FIG. 2 and a funnel 21 is placed in the upper open end of the tube. The vibrator 20 is energized and, while tube 10 is being vibrated, it is filled with a measured weight (1630 grams) of the powdered $UO_2$, as designated at 30. After this measured quantity has been placed in the tube 10, a weight or "rider" 22 is placed on top of the powder and the vibrating of the tube is continued until such time as the powdered material attains a density of 7.0–7.2 grams/cc.

The weight or rider is then removed from the tube and the second end cap 15' slipped into the tube and welded thereto as at 16', the cap 15' seating on the powder in the tube. The welding of cap 15' to tube 10 must be performed as rapidly as possible to prevent excessive heating of the contained gases with the resulting expansion causing a defective weld, and preferably should be performed in a suitable enclosure. By contrast, the initial cap 15 may be welded to tube 10 in a normal manner, as the tube is then empty and open to atmosphere.

The filled and sealed tube is then rotary swaged to reduce its diameter, increase its length, and compact the powdered filling to the requisite final density. The rotary swaging may be performed and any known rotary swaging apparatus such as, for example only, a "Torrington No. 4" swaging machine. An axial sectional view through the dies 40 of such a machine is shown in FIG. 4. In the particular fuel element selected for detailed description, the filled and sealed tube is first rotary swaged by dies 40 having a nominal diameter of 0.6875", a feeding speed of around 48 inches per minute being used. The diameter of the swaged tube is successively reduced by successive rotary swaging reductions using dies of 0.625", 0.5625", and 0.500" nominal size.

The 0.500" nominal size die provided a swaged diameter of the fuel elements averaging 0.510". This swaged diameter was then reduced by further rotary swaging, in increments of 0.002", to obtain a final length of the fuel element of $72''\pm\frac{1}{2}''$ and a final diameter of $0.500''\pm0.002''$. The final cladding thickness is $0.026''\pm0.0025''$ and the final density of the oxide compound is of the order of 9.4 grams/cc. or greater.

The finished fuel element 10' is shown in FIG. 5, wherein the ends have been finished to blunt points about $\frac{1}{2}''$ long, for example, as indicated at 17, 17.

The final density obtainable in the swaged fuel element varies with the type of active material compound used. In developing the invention, tests were made with uranium oxides produced by different processes, as well as with thorium oxide. Both $UO_2$ and $U_3O_8$ were used, the tests being performed on ceramic grade oxides obtained from the Mallinckrodt Chemical Company. Some additional oxides obtained from the same source, and designated DY–10 and DY–12, were also tested. However, the best results in swaged fuel elements have been obtained with a high-fired uranium oxide prepared from ammoniated uranyl fluoride and nitrate by the Y–12 Plant at the Oak Ridge National Laboratory, as this particular material could be produced most uniformly with respect to tap density, particulate size, and other characteristics related to powder variables. The $U_3O_8$ did not have an initial bulk or tap density sufficiently high to produce the final density set by the critical final values.

The best procedure for using the high-fired $UO_2$ is to blend a number of relatively small batches, and to subject the blended powder to a screen analysis in which 100 percent of the $UO_2$ passes through a 20-mesh screen. A test sample of each blend is screened through a —325 mesh screen. The $UO_2$ is further subjected to a flowability test in which a 100 gram sample passes through a $3/16''$ diameter orifice in ten (10) seconds or less.

FIGS. 6 through 9 are curves illustrating certain factors involved in forming swaged reactor elements in accordance with the present invention. In FIG. 6, curve A shows the reduction of a metal rod which is reduced from 0.638'' to 0.5'' outside diameter at constant volume. Curve B shows the reduction of an empty metal tube from 0.75'' outside diameter, with 0.028'' wall thickness, to 0.500'' outside diameter at constant volume. Curves A and B thus represent the two asymptotes of the swaged oxide fuel pin whose reduction is shown in curve C which is a curve calculated from the final volume of the swaged fuel pin at 0.500'' diameter. The point of tangency of the fuel pin curve C indicates the point of maximum density and further diameter reduction beyond this point does not improve the $UO_2$ density. Curve D indicates the reduction of a solid rod from the same starting diameter as the swaged element and represents the minimum density increase that can be obtained from the swaging process. The theoretical limits of length increase with respect to outside diameter are thus represented by curves B and D. From these curves, it may be deduced that swaging of powder filled metal clad elements will fall on a curve somewhere between curves B and D and will approach the constant volume slope of curves A and D at a different rate depending on the type of powder in the element being swaged.

FIG. 7 graphically depicts the change in wall thickness with swaging. Curve A' represents the change in the wall thickness of a tube being swaged over a mandrel of the same material as the tubing, with the tube being integrally bonded with the mandrel and not free to elongate differentially with respect to the mandrel. Curve B' represents the wall thickness change of any empty tube, of the same wall thickness and material, swaged through equivalent percentage area reductions. Curve C' represents the actual wall thickness change of the cladding of the swaged oxide fuel pin as calculated from the starting volume of the cladding and the length change. From this figure, it may be seen that the initial swaging follows the empty tube curve B' until the oxide density increases. As the oxide density increases to theoretical maximum, the slope of curve C' then changes to agree with curve A', which appears to represent the theoretical maximum wall thickness change in swaging of the clad oxide element.

Figure 8:
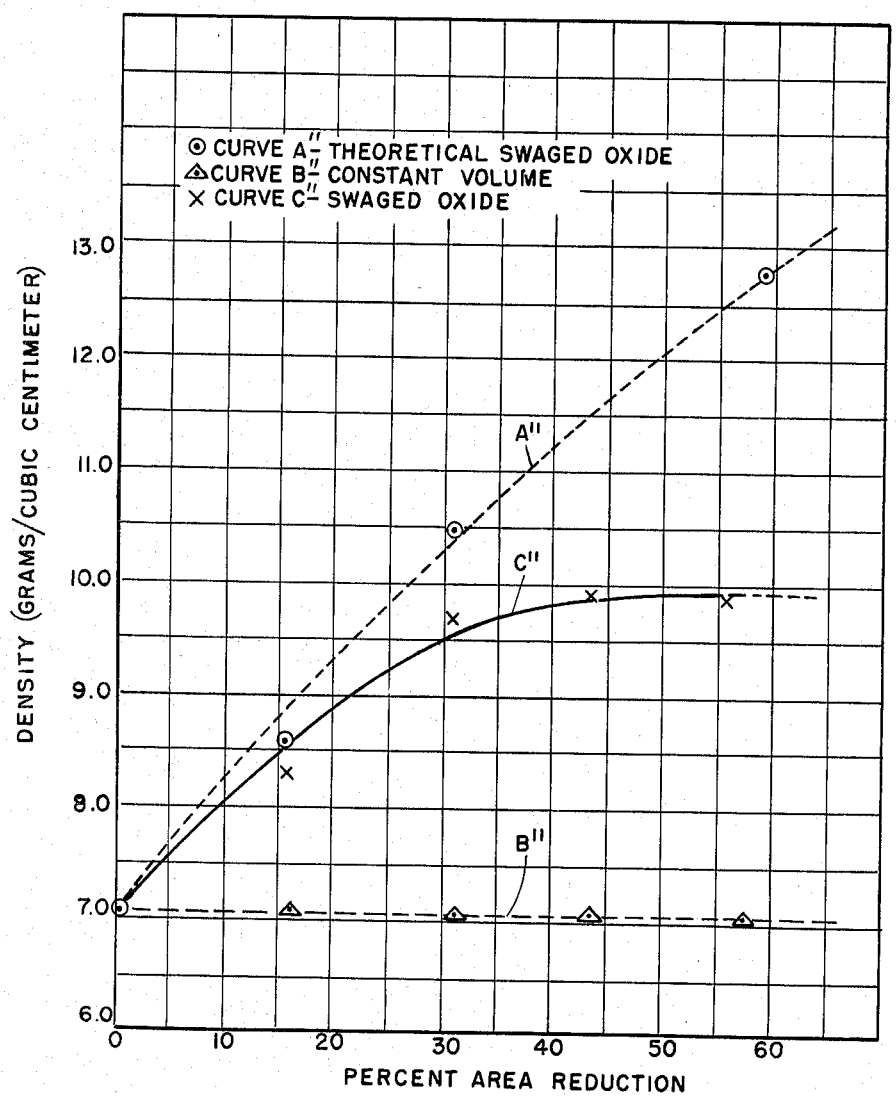

FIG. 8 graphically illustrates the density change with percent area reduction. Curve A'' represents the theoretical maximum density change for $UO_2$ swaged in a stainless steel tube with zero increase in length of the element. Curve B'' represents the minimum density change, which is the constant volume or zero density change. Curve C'' is the calculated density increase in swaging high-fired $UO_2$ in stainless steel tubing. It will be noted that curve C'' closely parallels curve A'' until the density of the oxide approaches its maximum theoretical value, and then follows the slope of constant volume curve B''.

As previously stated, the critical factors involved in meeting the final values of length, thickness of cladding, overall cross-sectional area, and density of the swaged powder, involve proper selection of the length, wall thickness, and outside diameter of the cladding and the starting density of the powdered filling therein, with the amount of powdered filling being carefully measured by weighing.

Figure 9:
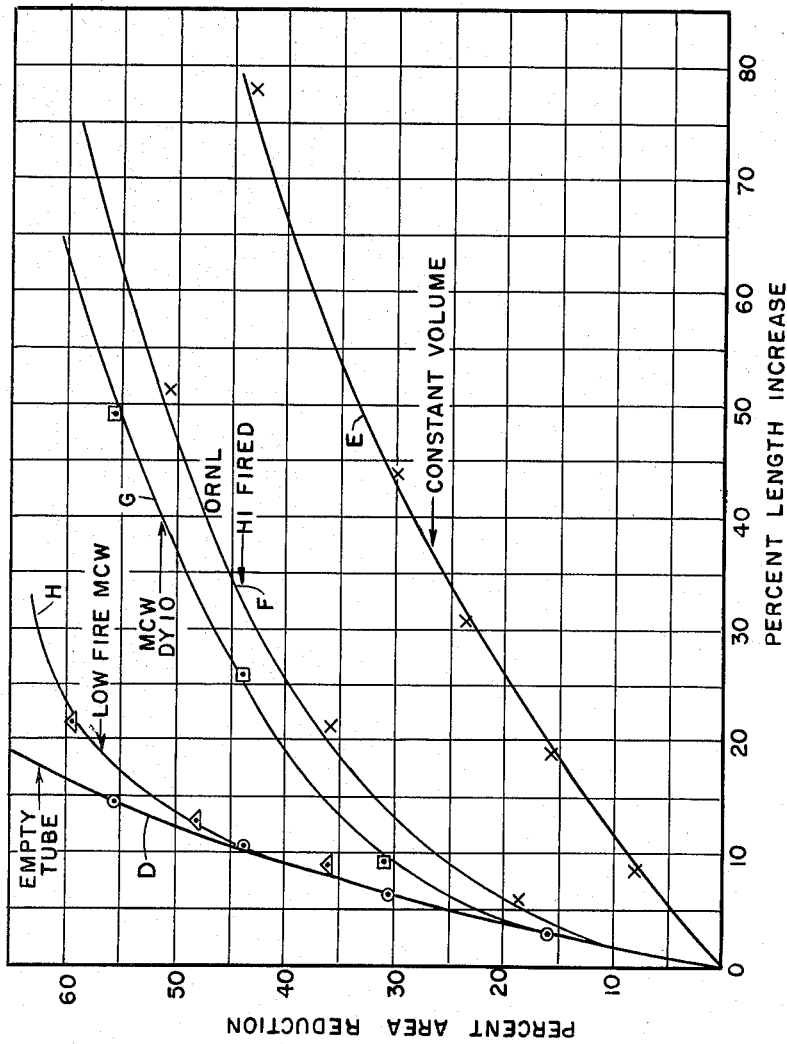

Referring to FIG. 9, the curves therein represent the variation of percent length increase with percent area reduction. Curve D represents the relation for a swaged empty tube, and curve E represents the relation of these factors with constant volume. Curves F, G and H represent the relation with different types of powdered material. Curve F represents the preferred high-fired uranium oxide. Curve G represents the aforementioned DY–10 oxide, and curve H represents the low-fired $UO_2$. It will be noted that the high-fired $UO_2$ of curve F attains a maximum density at a lower percentage area reduction than do either of the other two materials.

The end cap design is important from the standpoint of applicability of the swaging reduction with excessive thinning or breaking of the walls of the tube. The preferred form of end cap is that shown in FIGS. 1 and 3. However, under certain circumstances, the end caps shown in FIGS. 10 and 11 may be used. These end caps 115 and 115' are identical except for being reversed in position in the ends of the tube, and are formed by drilling a solid rod for a pre-set portion of the length, the end caps being welded to the ends of tube 10 as indicated at 116 and 116'.

A specific example of the invention has been described in detail with relation to the formation of an oxide fuel element utilizing stainless steel cladding and uranium oxide powder. However, while high-fired $UO_2$ with a stainless steel cladding represents the best example, at this time, of the application of the invention principles, the fuel elements or control elements may be produced using other cladding materials and other filling materials. For example, the cladding materials may be aluminum or zirconium alloys, and the filling materials may be $U_3O_8$, low-fired uranium oxides, thorium oxides, or, in the case of control elements, powdered high neutron cross-section materials such as boron carbide gadolinium oxide and europium oxide in a metal cladding.

While specific embodiments of the invention have been shown and described in detail to illustrate the application of the invention principles, it will be understood that the invention may be embodied otherwise without departing from such principles.

What is claimed is:

1. The method of fabricating an atomic energy reactor element, including a core of a powdered material and a metal cladding encasing said core, to preset final values of length, cross-sectional area, ratio of core material to cladding metal, and critical value of density of the powdered material; said method comprising the steps of providing a relatively elongated tube of the cladding metal having a length less than such final length and an outside diameter in excess of the outside diameter corresponding to such final cross-sectional area to thus provide a predetermined amount of metal; sealingly closing one end of said tube; filling the tube with a predetermined weight of such powdered material; during such filling, continuously vibrating the tube to compact the powdered material to a density such that, when the filled tube is sealed at its open end and concurrently increased in length and reduced in cross-sectional area to attain such final values of length and cross-sectional area, the density of the powdered material will at least equal such critical final density.

2. The method of fabricating an atomic energy reactor element, including a core of a powdered material and a metal cladding encasing said core, to preset final values of length, cross-sectional area, ratio of core material to cladding metal, and critical value of density of the powdered material; said method comprising the steps of providing a relatively elongated tube of the cladding metal having a length less than such final length and an outside diameter in excess of the outside diameter corresponding to such final cross-sectional area to thus provide a predetermined amount of metal; sealingly closing one end of said tube; filling the tube with a predetermined weight of such powdered material; during such filling, continuously vibrating the tube to compact the powdered material to a density such that, when the filled tube is sealed at its open end and rotary swaged to attain such final values of length and cross-sectional area, the density of the powdered material will at least equal such critical final density.

3. The method of fabricating an atomic energy reactor element, including a core of a powdered material and a metal cladding encasing said core, to preset final values of length, cross-sectional area, ratio of core material to cladding metal, and critical value of density of the powdered material; said method comprising the steps of providing a relatively elongated tube of the cladding metal having a length less than such final length and an outside diameter in excess of the outside diameter corresponding to such final cross-sectional area to thus provide a predetermined amount of metal; sealingly closing one end of said tube; filling the tube with a predetermined weight of such powdered material; during such filling, continuously vibrating the tube to compact the powdered material; and continuing such vibrating until the powdered material has been compacted to a density such that, when the filled tube is sealed at its open end and rotary swaged to attain such final values of length and cross-sectional area, the density of the powdered material will at least equal such critical final density.

4. The method of fabricating an atomic energy reactor element, including a core of a powdered material and a metal cladding encasing said core, to preset final values of length, cross-sectional area, ratio of core material to cladding metal, and critical value of density of the powdered material; said method comprising the steps of providing a relatively elongated tube of the cladding metal having a length less than such final length and an outside diameter in excess of the outside diameter corresponding to such final cross-sectional area to thus provide a predetermined amount of metal; sealingly closing one end of said tube; filling the tube with a predetermined weight of such powdered material; during such filling, continuously vibrating the tube to compact the powdered material; continuing such vibrating until the powdered material has been compacted to a density such that, when the filled tube is sealed at its open end and rotary swaged to attain such final values of length and cross-sectional area, the density of the powdered material will at least equal such critical final density; sealingly closing the open end of the tube; and rotary swaging the filled and sealed tube to such final values of length and cross-sectional area to increase the density of the powdered material to such critical final value.

5. The method of fabricating an atomic energy reactor element, including a core of a powdered material and a metal cladding encasing said core, to preset final values of length, cross-sectional area, ratio of core material to cladding metal, and critical value of density of the powdered material; said method comprising the steps of providing a relatively elongated tube of the cladding metal having a length less than such final length and an outside diameter in excess of the outside diameter corresponding to such final cross-sectional area to thus provide a predetermined amount of metal; inserting into one end of said tube a hollow bullet nose shape metal end cap, having a close fit within said tube, with its open end substantially flush with the end of said tube; sealing the outer end of said cap to the outer end of said tube; filling the tube with a predetermined weight of such powdered material to a predetermined density intermediate the loose density and such critical final density of the powdered material, such amount in conjunction with said metal providing a predetermined ratio of core material to cladding metal; inserting into one end of said tube a second hollow bullet nose shape metal end cap, having a close fit within said tube, with its open end substantially flush with the open end of said tube; sealing the outer end of said second cap to the outer end of said tube; and rotary swaging the filled and sealed tube to such final values of length and cross-sectional area to increase the density of the powdered material to such critical final value.

6. The method of fabricating an atomic energy reactor element, including a core of a powdered material and a metal cladding encasing said core, to preset final values of length, cross-sectional area, ratio of core material to cladding metal, and critical value of density of the powdered material; said method comprising the steps of providing a relatively elongated tube of the cladding metal having a length less than such final length and an outside diameter in excess of the outside diameter corresponding to such final cross-sectional area to thus provide a predetermined amount of metal; inserting into one end of said tube a hollow bullet nose shape metal end cap, having a close fit within said tube, with its open end substantially flush with the end of said tube; welding the outer end of said cap to the outer end of said tube; filling the tube with a predetermined weight of such powdered material; during such filling, continuously vibrating the tube to compact the powdered material; continuing such vibrating until the powdered compound has been compacted to a density such that, when the filled tube is sealed at its open end and rotary swaged to attain such final values of length and cross-sectional area, the density of the powdered material will at least equal such critical final density; inserting into the open end of said tube a second hollow bullet nose shape metal end cap, having a close fit within said tube, with its open end substantially flush with the open end of said tube; welding the outer end of said second cap to the outer end of said tube; and rotary swaging the filled and sealed tube to such final values of length and cross-sectional area to increase the density of the powdered material to such critical final value.

7. The method of fabricating an atomic energy reactor element, including a core of a powdered material and a metal cladding encasing said core, to preset final values of length, cross-sectional area, ratio of core material to cladding metal, and critical value of density of the powdered material; said method comprising the steps of providing a relatively elongated tube of the cladding metal having a length less than such final length, an outside diameter in excess of the outside diameter corresponding to such final cross-sectional area to thus provide a predetermined amount of metal, and a wall thickness related to its length and outside diameter such as to provide a metal volume coordinated with such final ratio of active material to cladding metal; inserting into one end of said tube a hollow bullet nose shape metal end cap, having a close fit within said tube, with its open end substantially flush with the end of said tube; welding the outer end of said cap to the outer end of said tube; filling the tube with a predetermined weight of such powdered material; during such filling, continuously vibrating the tube to compact the powdered material and continuing the vibrating until the powdered material has been compacted to a density of from 7.0 to 7.2 grams/cc.; inserting into the open end of said tube a second hollow bullet nose shape metal end cap, having a close fit within said tube, with its open end substantially flush with the open end of said tube and its closed end contacting the compacted powdered material; welding the outer end of said second cap to the outer end of said tube; and rotary swaging the filled and sealed tube to preset final values of length, cross-sectional area, and wall thickness of the cladding to increase the density of the powdered material to a value of the order of 9.5 grams/cc.

8. A method of preparing a ceramic element for use in a nuclear reactor comprising placing a ceramic powder in a closed metal tube, vibrating the ceramic powder within the tube until it reaches a predetermined intermediate density between that of loose powder and a predetermined final density, and swaging the metal tube to reduce the diameter of the tube while concurrently increasing its length until the predetermined final density of the ceramic powder is attained.

9. The method of claim 8 wherein the ceramic powder is powdered $UO_2$ and its intermediate density is in the range of 7.0–7.2 grams/cc.

References Cited by the Examiner
UNITED STATES PATENTS

| | | | |
|---|---|---|---|
| 1,084,115 | 1/1914 | Slick et al. | 29—422 |
| 1,989,186 | 1/1935 | De Bats. | |
| 2,405,201 | 8/1946 | Franck | 29—422 |
| 2,435,227 | 2/1948 | Lester | 75—214 |
| 2,805,473 | 9/1957 | Handwerk et al. | |
| 2,818,605 | 1/1958 | Miller. | |
| 2,825,688 | 3/1958 | Vernon | 176—55 |
| 2,825,689 | 3/1958 | Szilard et al. | 176—64 |
| 2,864,758 | 12/1958 | Shackelford. | |
| 2,872,402 | 2/1959 | Ura. | |
| 2,885,287 | 5/1959 | Larson. | |
| 2,947,080 | 8/1960 | Kates et al. | |
| 2,947,676 | 8/1960 | Zambrow | 29—473.5 |

OTHER REFERENCES

HW–52729, Sept. 18, 1957 in particular, pp. 14 and 16.

REUBEN EPSTEIN, *Primary Examiner.*

ROGER L. CAMPBELL, WILLIAM GILES, CARL D. QUARFORTH, LEON D. ROSDOL, *Examiners.*